Aug. 29, 1961 H. J. KOZICKI 2,998,265
VEHICLE SUSPENSION
Filed Feb. 21, 1958 4 Sheets-Sheet 1

H. J. KOZICKI
INVENTOR.

BY E. C. McRAE
J. R. FAULKNER
T. H. OSTER
ATTORNEYS

Aug. 29, 1961 H. J. KOZICKI 2,998,265
VEHICLE SUSPENSION
Filed Feb. 21, 1958 4 Sheets-Sheet 2

H. J. KOZICKI
INVENTOR.

BY E. C. McRAE
J. R. FAULKNER
T. H. OSTER
ATTORNEYS

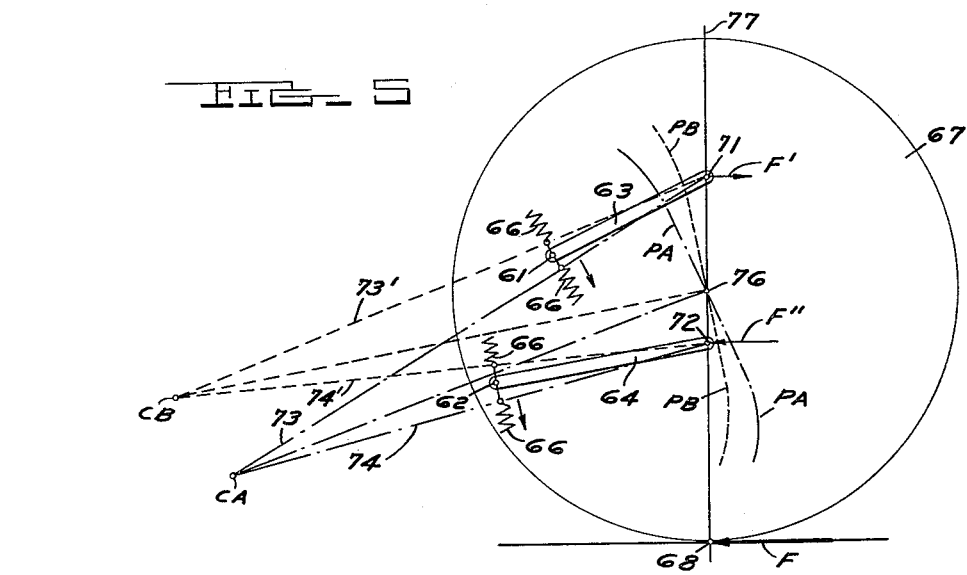
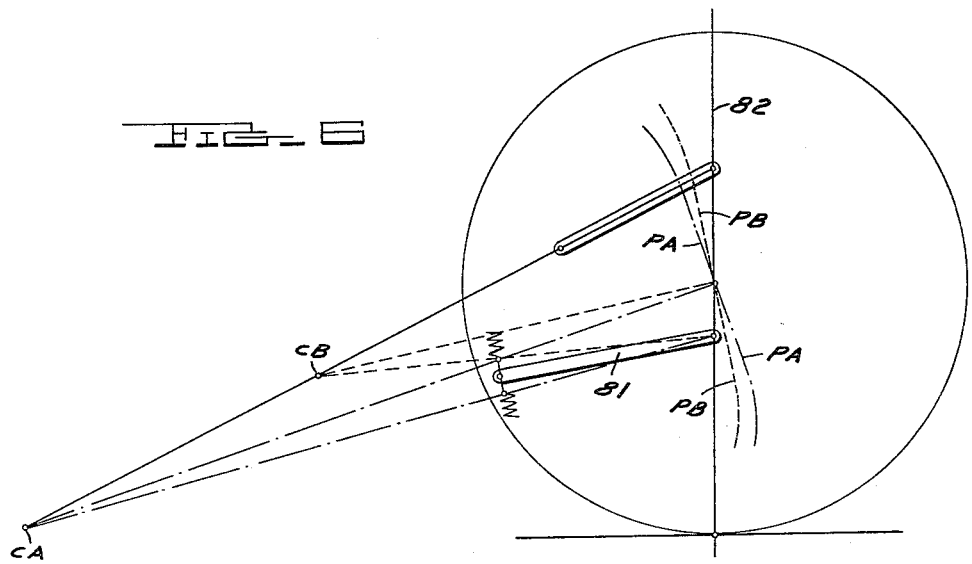

Aug. 29, 1961 H. J. KOZICKI 2,998,265
VEHICLE SUSPENSION
Filed Feb. 21, 1958 4 Sheets-Sheet 4
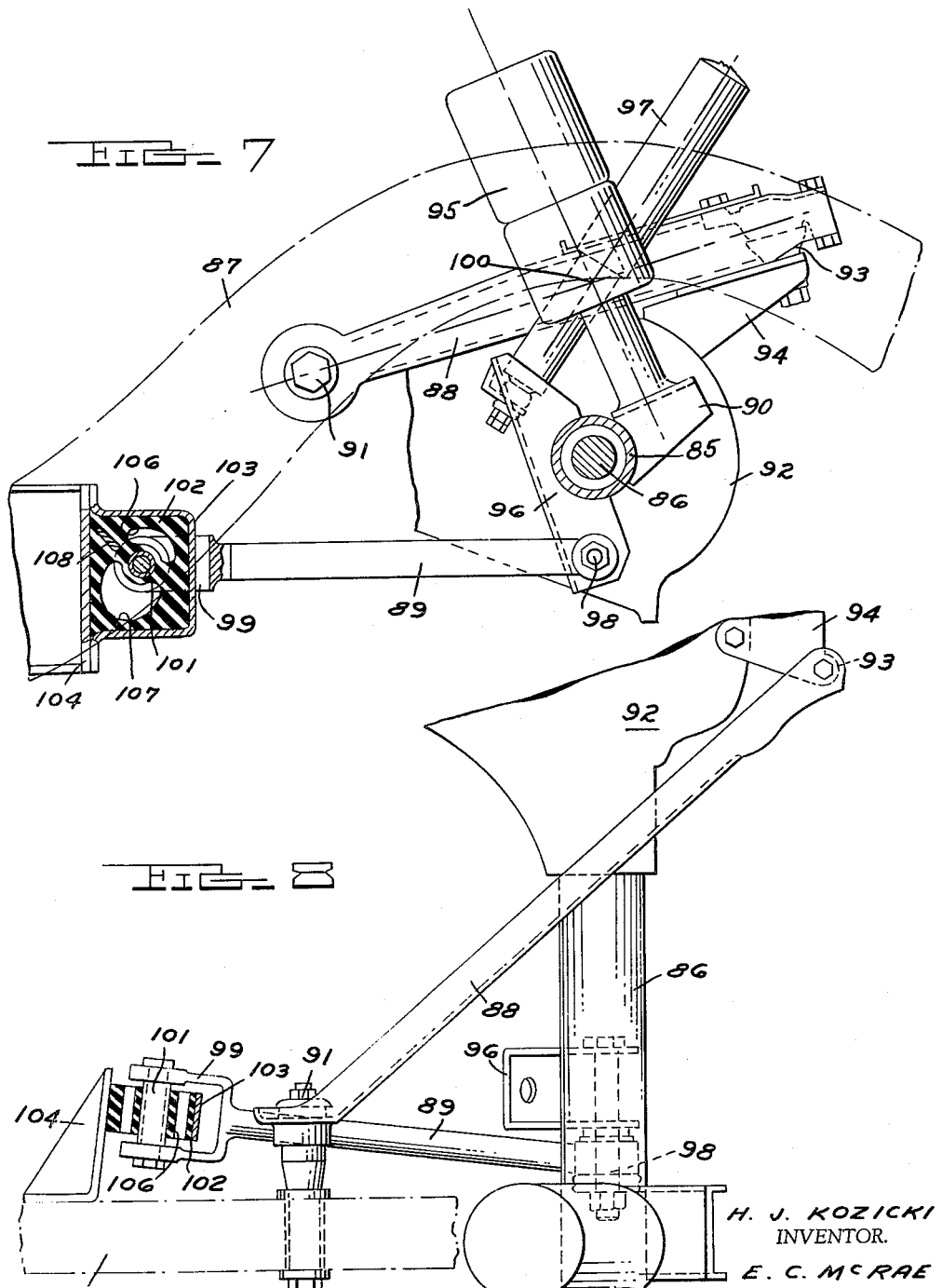
H. J. KOZICKI
INVENTOR.
E. C. McRAE
J. R. FAULKNER
T. H. OSTER
BY ATTORNEYS United States Patent Office 2,998,265
Patented Aug. 29, 1961

2,998,265
VEHICLE SUSPENSION
Henry J. Kozicki, Livonia, Mich., assignor to Ford Motor Company, Dearborn, Mich., a corporation of Delaware
Filed Feb. 21, 1958, Ser. No. 716,585
8 Claims. (Cl. 280—124)

This invention relates generally to a motor vehicle and more particularly to a wheel suspension for a motor vehicle.

An object of the present invention is to provide a vehicle wheel suspension having different wheel paths during vehicle acceleration and braking to counteract the tendency of the vehicle to vary its vertical position during acceleration and braking and also to provide variable understeer under these conditions.

During acceleration the transfer of vehicle weight rearwardly tends to cause the rearward portion of a vehicle to squat, and conversely, during braking, the transfer of weight forwardly causes the rearward portion of a vehicle to lift. These characateristics are undesirable, and an object of the present invention is to provide a vehicle wheel suspension in which anti-squat and anti-lift forces are produced to counteract those resulting from the weight transfer so that the vehicle will remain at substantially a constant height both during acceleration and braking.

It is well known in the art to provide a suspension having such geometry that an assumed point of contact between the wheel and the road moves at an angle to the vertical during jounce and rebound wheel movements to produce anti-squat and anti-lift forces. Such a wheel path for a rear wheel would be along a line through the point of contact between the wheel and the road, and inclined rearwardly in an upward direction with respect to a vertical line at this point. Unfortunately, however, a single wheel path such as this does not adequately compensate for both vehicle squat and lift. One reason for this is that a vehicle can decelerate much faster than it can accelerate, and consequently, much greater forces are required during braking to counteract the greater resulting lift forces. In addition, the available counteracting forces resulting from braking are much smaller than those resulting from acceleration. In a conventional rear wheel drive vehicle, all of the acceleration forces are applied to the rear wheels and can be utilized to counteract the rearward weight shift. The braking forces, however, are distributed between the front and rear wheels, and only a portion, 40% for example, of the total braking effort is applied at the rear wheels. Consequently, a much smaller force is available to counteract the forward weight shift during braking.

As a result of these factors, the usual rear suspension cannot provide optimum compensation for both acceleration and braking, but must be a compromise or must sacrifice one for the other. If the suspension geometry provides a wheel path providing 100% anti-squat during acceleration, then the ant-lift properties are inadequate and the rear portion of the vehicle will lift appreciably during braking. On the other hand, if 100% anti-lift is provided, then the anti-squat forces will be excessive and may cause the rear portion of the vehicle to rise substantially during acceleration.

The present invention meets the above problem by providing different wheel paths during acceleration and braking so that both the tendency of the vehicle to lift during braking and to squat during acceleration can be adequately counteracted and the vehicle maintained on substantially an even keel regardless of acceleration and braking forces. In an embodiment of the invention this is accomplished, in a rear suspension of the type having upper and lower generally longitudinally extending suspension members, by providing a movable support for one of the pivotal connections of one of the members. This movable support may be in the form of a spring mounting or a flexible rubber mounting designed to permit appreciable vertical movement when subjected to acceleration or braking forces and to so change the geometry of the suspension members as to provide different wheel paths, depending upon the instantaneous condition of the vehicle operation. For example, the movable support will yield under acceleration forces in such manner that the instantaneous center between the upper and lower suspension members moves forwardly so that the path of movement of the point of contact between the wheel and the road moves in a path at a smaller angle to the vertical than during normal constant speed vehicle operation. On the other hand, during braking the instantaneous center moves rearwardly to provide a wheel path for this contact point having a greater angle to the vertical to provide the proper force component to counteract the tendency of the vehicle to lift.

In addition to the foregoing, the present invention provides a wheel suspension achieving variable understeer during conditions of acceleration and deceleration. Motor vehicle rear suspensions are conventionally designed with considerable understeer to control the stability of the vehicle during cornering. A greater amount of understeer is required when the vehicle is accelerating during cornering than when it is travelling at constant speed or is decelerating, since the tires lose some of their cornering ability and conditions are created which might result in an uncontrolled skid. Consequently, it has been necessary to provide sufficient understeer into the suspension geometry to compensate for the most aggravated conditions of acceleration during cornering. This results in an excessive amount of understeer during other operating conditions, and causes some loss of precise handling qualities.

It is, therefore, another object of the present invention to provide a rear suspension for a motor vehicle in which a variable amount of understeer is present depending upon whether or not the vehicle is accelerating or braking, or is travelling at a constant speed. With the present invention, a greater amount of understeer is automatically introduced under conditions of acceleration, with a lesser amount being introduced under constant speed operation, and a still smaller amount during conditions of deceleration or braking.

Other objects and advantages of this invention will be made more apparent as this description proceeds, particularly in connection with the accompanying drawings, in which:

FIGURE 5 is a diagrammatic view of a modification;

FIGURE 6 is a diagrammatic view of another modification;

FIGURE 7 is a fragmentary side elevational view of a rear suspension embodying my invention;

FIGURE 8 is a fragmentary plan view of the construction shown in FIGURE 7.

Figure 1:
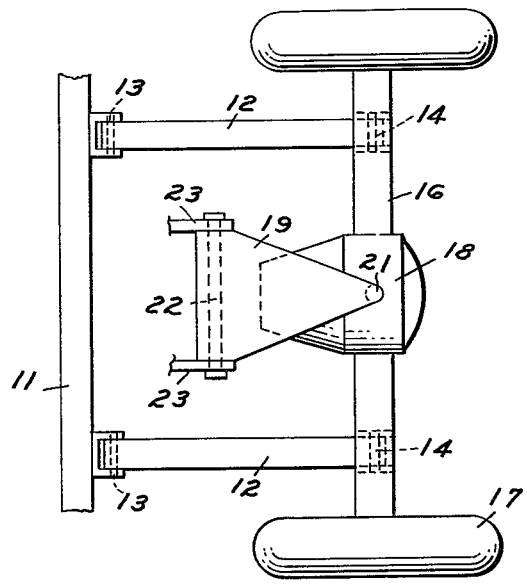
FIGURE 1 is a diagrammatic plan view of an embodiment of my invention.
Figure 2:
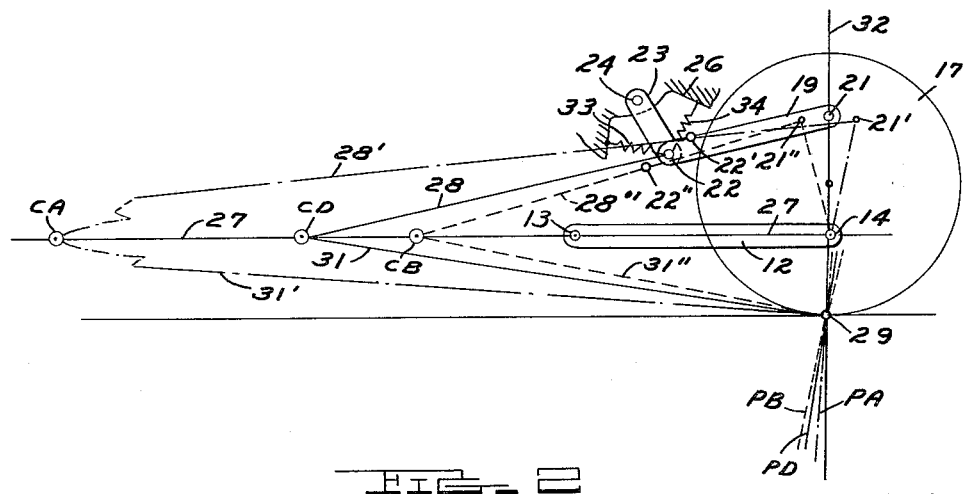
FIGURE 2 is a diagrammatic side elevational view of the construction shown in FIGURE 1.

Referring now to the drawings, and particularly to the embodiment of the invention shown diagrammatically in FIGURES 1 and 2, the reference character 11 indicates a cross frame member supporting a pair of suspension arms 12 which are pivotally connected to the frame member at 13. The rearward ends of the suspension arms 12 are pivotally connected at 14 to an axle 16. Road wheels 17 are conventionally supported upon the opposite ends of the axle 16, and a differential housing 18 is located at the center of the axle and contains conventional differential gearing.

A single upper suspension arm 19 is located vertically above the plane of the lower suspension arms 12, and is pivotally connected at its rearward end 21 to the upper portion of the differential housing 18. The upper suspension arm 19 is generally triangular in shape to provide lateral stability to the suspension system, and is pivotally connected at 22 to a shackle 23, best shown in FIGURE 2. The upper end of the shackle 23 is in turn pivotally connected at 24 to a bracket 26 supported upon the vehicle frame.

It will be noted that the pivotal mountings 13 and 14 for the opposite ends of the lower suspension arms 12 lie in a plane indicated by the reference character 27. In the present instance, this plane is horizontal but it need not necessarily be so. In the design position of the vehicle the upper suspension arm 19 lies in a plane 28 which is inclined downwardly in a forward direction to converge with the plane 27 of the lower arms. The two planes 27 and 28 meet in an instantaneous center line CD (Center-Design).

It will be noted from an examination of FIGURE 2 that the point of contact 29 between the wheel 17 and the road will follow a path PD (Path-Design, moving upward in jounce and downward in rebound. The instantaneous path PD is at right angles to a line 31 joining the center line CD with the contact point 29. It will be noted that the wheel path PD is inclined with respect to a line 32 extending vertically through the wheel contact point 29.

The upper suspension arm 19 is mounted in such manner as to permit the arm to be moved bodily when subjected to acceleration and braking forces. By reason of the pivotal connection 22 of the forward end of the suspension arm 19 to the shackle 23, the pivotal connection 22 can swing in an arc about the upper axis 24 of the shackle 23. A pair of coil springs 33 and 34 engage opposite sides of the shackle 23 and have their opposite ends supported upon the frame member 26. The springs thus keep the shackle in the design position under normal circumstances, but are yieldable to permit shifting of the suspension arm 19 under acceleration and braking forces.

When the vehicle is accelerating, for example, the upper suspension arm 19 exerts a rearward force upon the shackle 23, compressing the spring 34. This moves the upper suspension arm 19 from the plane 28 to the plane 28', shown in a dot-dash line. The pivots now occupy the positions 21' and 22'. The plane 28' through this position of the upper suspension arm will, when projected forwardly, intersect the plane 27 of the lower suspension arms at an instantaneous center CA (Center-Acceleration).

With the suspension arms thus related during acceleration, the contact point 29 between the wheel and road moves along a path PA (Path-Acceleration) at right angles to a line 31' connecting the contact point 29 with the center CA. It will be noted that this wheel path PA, while still at an angle with the vertical line 32, subtends a smaller angle with the vertical than the path PD followed by the wheel contact point during normal constant speed driving.

During vehicle braking, on the other hand, a forward force is exerted by the upper suspension arm 19, compressing the lower coil spring 33 and shifting the upper suspension arm from the plane 28 to the plane 28", shown by a dotted line. The pivots of the upper arm now occupy the positions 21" and 22". This plane 28" will intersect the plane 27 of the lower suspension arms at an instantaneous center CB (Center-Braking). It will be noted that the center CB is considerably rearward of the centers CA and CD, and results in movement of the wheel contact point 29 along a path PB (Path-Brake). This path is also angularly related with respect to the vertical line 32, but subtends a greater angle with the vertical than either the path PA or the path PD.

From the foregoing, it will be seen that the present suspension provides a variable wheel path for the rear wheels during wheel jounce and rebound movements when the vehicle is accelerating and braking. The path PB of the wheel contact point 29 during braking has a greater inclination with respect to the vertical line 32 than the path PA of the wheel contact point during acceleration. The resultant force in a vertical direction which is available to counteract the tendency of the rearward portion of the vehicle to squat during acceleration and to lift during braking may be calculated by multiplying the force between the tire and the road by the tangent of the wheel path angle. As mentioned earlier, the force resulting from braking is considerably smaller than that resulting from acceleration due to the fact that the braking force is distributed between the front and rear wheels while the accelerating force is applied solely at the rear wheels. With a normal rear suspension having a constant wheel path during acceleration and braking, it is impossible to adequately counteract both the acceleration squat and brake lift forces acting on the vehicle. The double wheel path of the present invention, however, enables both forces to be substantially counteracted even though the force between the tire and road is much less in braking than in acceleration. By properly designing the suspension, the braking force at the road multiplied by the tangent of the angle between the wheel path PB and the vertical line 32 can be made comparable to the larger acceleration force at the road multiplied by the tangent of the smaller angle formed by the wheel path PA and the vertical. The double wheel path provided by the present invention also enables compensation for the conditions resulting from the fact that the conventional vehicle is able to brake or decelerate much faster than it can accelerate.

Figure 3:
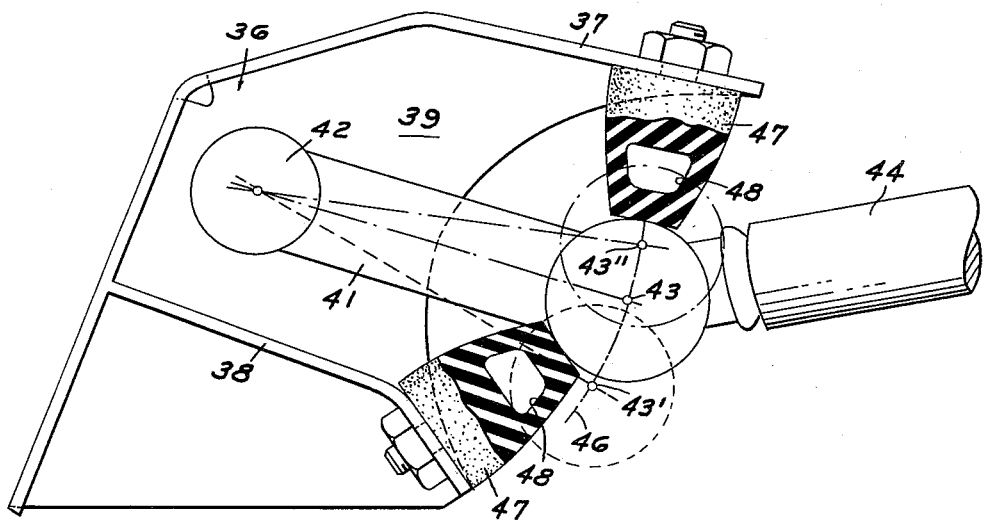
FIGURE 3 is a side elevational view of a mounting for the upper suspension arm of FIGURES 1 and 2.

FIGURE 3 illustrates a shackle type pivotal mounting which may be used in lieu of the mounting shown schematically in FIGURE 2, or which might be used as the mounting for the forward end of the lower suspension arm. A bracket 36 is suitably supported upon the vehicle frame, and has vertically spaced flanges 37 and 38 interconnected by side walls 39. A shackle link 41 is pivotally mounted at 42 upon the bracket, and at its opposite end is pivotally connected at 43 to the forward end of a suspension arm 44. It will be seen that this arrangement permits the forward end of the suspension arm to swing generally vertically along an arcuate path 46.

A pair of generally pear shaped rubber blocks 47 are mounted upon the flanges 37 and 38 of the frame bracket 36, and engage opposite sides of the pivotal connection 43 to hold the suspension arm in a neutral design position. Each block is formed with a cavity 48, and it will be apparent that the lower block will be deformed under acceleration loads to move the pivotal connection 43 downwardly to the point 43'. The upper block will be deformed under braking loads to move the connection 43 upwardly to the point 43". As previously discussed, different wheel paths will thus be obtained in acceleration and braking.

It will be understood, of course, that various other types of movable supports may be provided for one of the suspension members, and that in a double arm type of suspension as shown, the movable support may be associated with either the upper or the lower arm and with either arm end.

Figure 4:
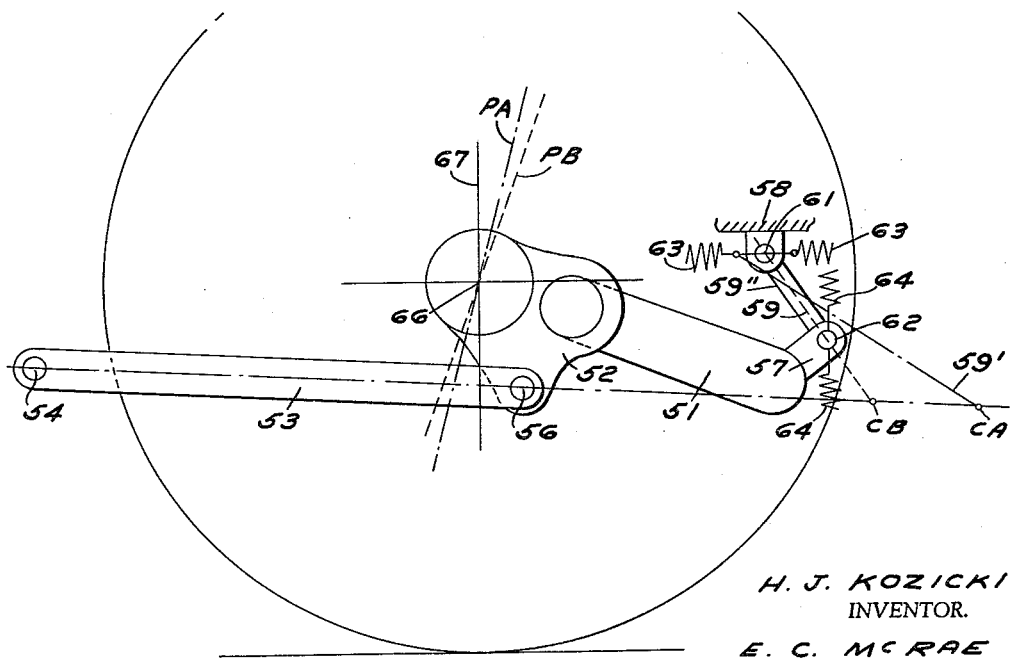
FIGURE 4 is a diagrammatic side elevational view of my invention as applied to a different type of vehicle suspension.

The double wheel path of the present invention may likewise be obtained with various other types of rear suspension, and I do not limit my invention to any particular suspension system. For example, there is shown a modification in FIGURE 4 in which the invention is applied to a rear suspension utilizing a floating axle tube 51 having its opposite ends connected to wheel support members 52. A pair of trailing arms 53 are provided, being connected at their forward ends 54 to the vehicle frame, and at their rearward ends 56 to the wheel supports 52. Centrally of the vehicle, a bracket 57 rigidly mounted upon the tube 51 is supported upon the vehicle frame 58 by means of a link 59 having pivotal connections 61 and 62 to the frame and bracket respectively. Both the pivotal connection 61 and the pivotal connection 62 are mounted for limited movement, and this is shown diagrammatically by springs 63 acting upon opposite sides of the pivot 61, and by springs 64 acting upon opposite sides of the pivot 62.

In this modification the accelerating and braking forces are applied at the center 66 of the rear wheel, and produce forces in the suspension bodily shifting the shackle 59, which may move by reason of the compliance provided by the springs 63 and 64 for the pivotal connections 61 and 62 respectivley. During acceleration the shackle 59 shifts to the position 59′ to provide an instantaneous center CA and a wheel path PA for the center of the rear wheel. When subjected to braking forces the shackle shifts to the position 59″ forming an instantaneous center CB and a wheel path PB. Here again it will be noted that the path PB in braking subtends a greater angle with the vertical plane 67 than does the path PA in acceleration so that the forces available will properly counteract both acceleration squat and brake lift even though these forces are considerably different in magnitude.

With particular reference to FIGURE 5, which illustrates how the present invention achieves variable understeer in acceleration and braking, it will be noted that the pivotal connections 61 and 62 for the forward ends of the upper and lower suspension arms 63 and 64 respectively are so mounted upon the vehicle frame as to permit vertical movement of the forward ends of the suspension arms. These mountings are shown schematically as comprising opposed coil springs 66 acting upon the pivotal connections to normally hold them in the design position shown. These mountings may, of course, be of the type shown in FIGURE 3, being shown here schematically for the purposes of illustration.

Under conditions of vehicle acceleration, the force F acts upon the rear wheel 67 at the point of contact 68 between the wheel and the road. This force produces a couple F′—F″ at the rear pivotal connections 71 and 72 for the upper and lower suspension arms respectively. These forces in turn produce force components at the forward ends of the suspension arms in a downward direction. The upper and lower suspension arms swing downwardly against the action of the lower springs 66 to positions in planes 73 and 74 respectively. These planes intersect at an instantaneous center CA and produce a movement of the wheel center 76 along a path PA.

Under conditions of vehicle braking the forces are reversed and the upper and lower suspension arms swing upwardly to planes 73′ and 74′ respectively. These planes intersect at an instantaneous center CB and the geometrical suspension arrangement under these conditions causes the wheel center 76 to move along a path PB.

Under conditions of constant speed it will be apparent that the path of the wheel center 76 will lie intermediate the paths PA and PB.

The resulting different wheel paths during acceleration and deceleration result in variable understeer for the rear wheels during cornering. Vehicle understeer is produced by a small steering movement of the rear wheels in the same direction in which the front wheels are turned during cornering. For example, if the vehicle is turning to the right a small rotation of the rear axle in a clockwise direction about its center, will produce a steering movement of the rear wheels in the same direction as the front wheels but considerably smaller. This is called understeer, and is desirable to provide proper vehicle control and handling characteristics during cornering. It can be accomplished by a suspension geometry for the rear wheels such that the outer wheel on a curve will move forwardly while the inner wheel will move rearwardly. Since centrifugal force acts upon the vehicle body during cornering and tilts the body toward the outer side of the curve, the outer wheel will move in jounce while the inner wheel will move in rebound. Consequently, it will be seen from reference to FIGURE 5 that movement in jounce of the wheel center 76 upwardly along either the path PA or PB will move the wheel center forwardly. Conversely, movement of the wheel center 76 downwardly in rebound along either the path PA or PB will move the wheel center rearwardly. It will be apparent that this results in understeer, but that the amount of understeer varies depending upon whether the vehicle is being accelerated or decelerated. By reason of the construction shown, the path PA in acceleration is inclined with respect to a vertical line 77 through the wheel center 33 at a greater angle than the inclination of the path PB during deceleration. Consequently, the amount of understeer is greater during acceleration than during braking or deceleration.

FIGURE 6 illustrates diagrammatically a suspension in which only the lower arm 81 is provided with a movable pivotal connection, and it will be seen that this construction likewise results in wheel paths PA and PB during acceleration and braking respectively which are inclined at different angles to the vertical line 82 to produce variable understeer under these conditions.

FIGURES 7 and 8 illustrate a rear suspension of the type shown diagrammatically in FIGURE 6 in which compliance is provided for the forward pivotal mounting of the lower suspension arm. In this suspension the rear axle 86 and rear axle tube 85 are supported upon the vehicle side frame rails 87 by means of upper and lower suspension arms 88 and 89 respectively. Only one side of the vehicle is shown, it being understood that the opposite side is symmetrical.

The upper suspension arm 88 is pivotally mounted upon the frame rail 87 by a pivotal mounting 91, and its rearward end is connected to the rearward portion of the differential carrier 92 by means of a flexible mounting 93 carried upon a bracket 94 supported upon the carrier.

A bracket 90 is welded to the rear axle tube 85 and supports the lower end of an air spring 95, the upper end of which is suitably connected to the vehicle frame.

Another bracket 96 is welded to the rear axle tube 85, and at its upper end supports the lower end of a tubular shock absorber 97, the upper end of which is conventionally connected to the vehicle frame. The lower end of the bracket 96 provides a pivotal mounting 98 for the rearward end of the lower suspension arm 89. The forward end of the lower suspension arm 89 is formed with a clevis 99 supporting a pivot pin 101 which in turn is received within a rubber mounting block 102. The mounting block 102 is supported within metal frame 103 secured to a frame bracket 104 carried by the side frame rail 87.

It will be noted that the rubber mounting block 102 is formed with a pair of arcuate cavities 106 and 107 above and below, respectively, the pivot pin 101. These cavities permit a substantial movement of the forward end of the lower suspension arm in a vertical direction when the arm is subjected to acceleration or braking forces.

During braking, the forward end of the lower suspension arm 89 moves upwardly to substantially close the cavity 106 in the rubber block, and to effect a change in the wheel path as shown schematically in FIGURE 6. During acceleration, the forward end of the lower suspension arm moves downwardly to substantially close the lower cavity 107 in the rubber block, and to change the wheel path as also illustrated in FIGURE 6, and also to provide a variable understeer during acceleration and braking.

The rubber mounting block 102 has embedded therein a transversely extending metal reinforcement 108 located in an intermediate position between the cavities 106 and 107 to properly control the deformation of the rubber block during acceleration and deceleration.

It will be noted from FIGURE 7 that the axes of the upper suspension arm 88, shock absorber 97 and suspension spring 95 intersect, in side elevation, in a single point 100 located in a vertical plane through the wheel axis. With this arrangement the relatively high spring forces will not be introduced into the lower arm and a low rate resilient joint may be used in the compliance pivot 100. Similarly, the shock absorber loads on the lower arm are minimized.

It will be apparent that the constructions shown in the various drawings are each capable of achieving both variable understeer and also variable wheel path under conditions of acceleration and braking. In other words, the two features are entirely compatible and can be achieved in a single suspension. A greater amount of understeer can thus be obtained during acceleration than during braking, and at the same time the wheel path is such as to properly counteract the forces tending to result in acceleration squat. During braking, on the other hand, the understeer is less, and a different wheel path is provided to properly counteract brake lift.

It is possible, however, to so design the rear suspension geometry as to achieve a double wheel path with constant understeer, or a constant wheel path with variable understeer. A double wheel path with constant understeer can be obtained by so arranging the upper and lower suspension arms that the instantaneous center in braking and the instantaneous center in acceleration fall on a line extending through the wheel center. To achieve a constant wheel path with variable understeer, the upper and lower suspension arms can be arranged so that the instantaneous center in braking and the instantaneous center in acceleration lie on a line through the point of contact between the wheel and the road.

From the foregoing it will be apparent that the present invention encompasses various rear suspension geometrical arrangements and constructions capable of achieving the desired amount of variable understeer and/or double wheel path.

It will be understood that the invention is not to be limited to the exact construction shown and described, but that various changes and modifications may be made without departing from the spirit and scope of the invention, as defined in the appended claims.

What is claimed is:

1. In a motor vehicle, in combination, a frame, a wheel support, a road wheel rotatably mounted upon said wheel support, first and second generally longitudinally extending suspension members controlling the jounce and rebound movements of said road wheel relative to said frame, each of said suspension members being pivotally connected at one end to said frame and at its other end to said wheel support, and a movable support for one end of one of said suspension members to enable said one suspension member to be moved bodily substantial distances in opposite directions in a predetermined path only under the influence of acceleration and braking forces to different positions guiding said road wheel in different paths relative to said frame during acceleration and braking of said vehicle.

2. The structure defined by claim 1 which is further characterized in that resilient means are provided for said movable support normally holding said one suspension member in a neutral position, but yieldable in opposite directions when subject to acceleration and braking forces to permit substantial movement of said one suspension member in opposite directions.

3. In a motor vehicle, in combination, a frame, a wheel support, a road wheel rotatably mounted upon said wheel support, first and second generally longitudinally extending suspension members controlling the jounce and rebound movements of said road wheel relative to said frame, each of said suspension members being pivotally connected at one end to said frame and at its other end to said wheel support, and mounting means for one of the pivotal connections of one of said suspension members permitting movement of said pivotal connection in a predetermined path only to enable said one suspension member to be moved under the influence of acceleration and braking forces to different vertical positions to guide said road wheel in different paths relative to said frame during acceleration and braking of said vehicle.

4. The structure defined by claim 3 which is further characterized in that said vertically movable support is associated with the pivotal connection of one of said suspension members to said frame and is biased to a neutral position but yieldable under the influence of acceleration forces to a first position determining a first path of movement of a point on said wheel and under the influence of braking forces to a second position determining a second path of movement of said point on said wheel, said second path of movement having a greater inclination to the vertical than said first path of movement.

5. In a motor vehicle, in combination, a frame, a wheel support, a rear road wheel rotatably mounted upon said wheel support, upper and lower generally longitudinally extending suspension arms controlling the jounce and rebound movements of said road wheel relative to said frame, said lower suspension arm being pivotally connected at its forward end to said frame and at its rearward end to said wheel support, said upper suspension arm being pivotally connected at its rearward end to said wheel support, a link having one end pivotally connected to the forward end of said upper arm and its opposite end pivotally connected to said frame to guide the forward end of said upper arm in a path having a vertical component, and resilient means normally holding said link in a neutral position but yieldable in opposite directions under the influence of acceleration and braking forces to guide said road wheel in different paths during acceleration and braking of said vehicle the neutral position of said link being inclined with respect to a vertical plane through the axis of the pivotal connection of said link to said frame so that the forward end of said upper suspension arm moves vertically in opposite directions during acceleration and braking.

6. In a motor vehicle, in combination, a frame, a wheel support, a rear road wheel rotatably mounted upon said wheel support, upper and lower generally longitudinally extending suspension arms controlling the jounce and rebound movements of said road wheel relative to said frame, said lower suspension arm being pivotally connected at its forward end to said frame and at its rearward end to said wheel support, said upper suspension arm being pivotally connected at its rearward end to said wheel support, an elastomer type mounting pivotally connecting the forward end of said upper arm to said frame and adapted to permit substantial movement of the forward portion of said upper arm in a predetermined path only having a vertical component under the influence of acceleration and braking forces to guide said road wheel in different paths during acceleration and braking of said vehicle.

7. In a motor vehicle, in combination, a frame, a wheel support, a rear road wheel rotatably mounted upon said wheel support, upper and lower generally longitudinally extending suspension arms controlling the jounce and rebound movements of said road wheel relative to said frame, said upper and lower suspension arms being arranged in non-parallel relationship longitudinally of the vehicle and convergent toward the front of said vehicle whereby an assumed fixed point on said wheel at the point of contact with the ground moves in jounce and rebound in a path at an angle to a vertical line through said point, pivotal connections between the forward ends of said arms and said frame and between the rearward ends of said arms and said wheel support, one of said pivotal connections being mounted for guided vertical movement in a predetermined path only under the influence of longitudinal forces upon said wheel to vary the convergence of said suspension arms whereby said assumed fixed point on said wheel moves in a path at a different angle to said vetical line to vary the vertical forces on said frame to compensate for weight transfer during periods of changing rate of movement of said vehicle.

8. The structure defined by claim 7 which is further characterized in that said one pivotal connection is between the forward end of said upper link and said frame and is resiliently biased to a normal neutral position vertically but is yieldable to move downwardly under braking forces and upwardly under acceleration forces to vary the convergence of said arms and to vary the paths of movement of said assumed fixed point on said wheel, said wheel path during braking having a greater angularity with respect to said vertical line than during acceleration.

References Cited in the file of this patent

UNITED STATES PATENTS

| | | |
|---|---|---|
| 1,479,187 | Lansden | Jan. 1, 1924 |
| 2,028,991 | Pernice | Jan. 28, 1936 |
| 2,215,826 | Crane | Sept. 24, 1940 |
| 2,300,844 | Olley | Nov. 3, 1942 |
| 2,369,501 | Wagner | Feb. 13, 1945 |
| 2,393,183 | Parker | Jan. 15, 1946 |
| 2,558,381 | Pointer | June 26, 1951 |
| 2,860,870 | McIntyre | Nov. 18, 1958 |

FOREIGN PATENTS

| | | |
|---|---|---|
| 1,077,858 | France | May 5, 1954 |
| 912,534 | Germany | May 31, 1954 |